March 2, 1926.
H. JEZLER
1,574,819
SKINNING TOOL
Filed April 7, 1925
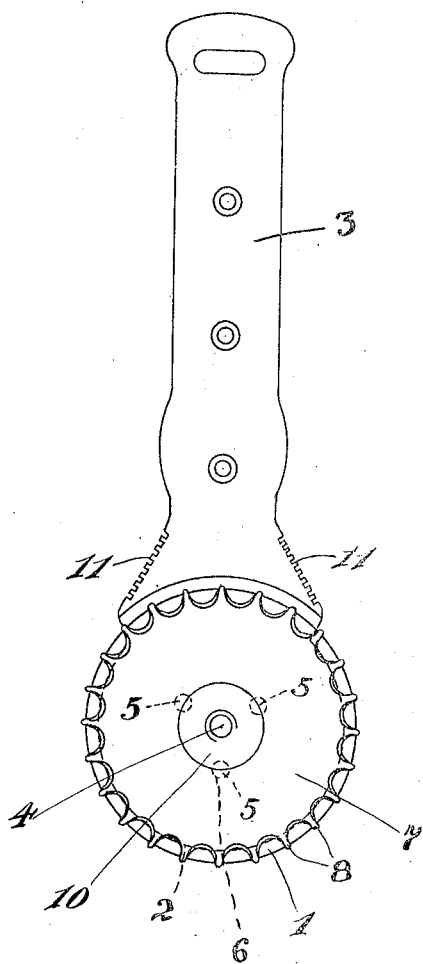
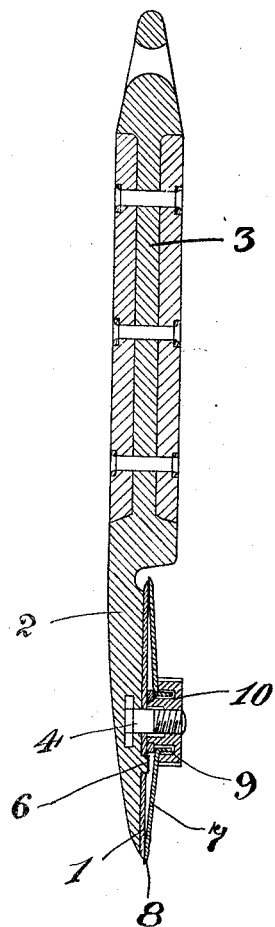
INVENTOR
Hubert Jezler
BY
Dean Fairbanks Obright & Hirsch
ATTORNEYS Patented Mar. 2, 1926.

1,574,819

UNITED STATES PATENT OFFICE.

HUBERT JEZLER, OF ZURICH, SWITZERLAND, ASSIGNOR TO CARL KLAIBER AND EMIL HAHNLOSER, BOTH OF ZURICH, SWITZERLAND.

SKINNING TOOL.

Application filed April 7, 1925. Serial No. 21,272.

*To all whom it may concern:*

Be it known that I, HUBERT JEZLER, a citizen of the Swiss Confederation, and resident of Zurich, Switzerland, have invented certain new and useful Improvements in Skinning Tools, of which the following is a specification.

This invention is an improved tool for use in separating the skin from an animal carcass. The main object of the invention is to so design and construct the parts that the skinning operation may be easily and quickly accomplished by untrained workers without liability of cutting or otherwise injuring the skin.

I am aware that it has heretofore been proposed to provide skinning knives with protecting devices, so that the cutting edge can not enter the skin, but all such constructions with which I am familiar are open to certain objections.

The present invention relates particularly to the shape and construction of the knife itself, and the shape and mounting of the protecting device associated therewith.

In my improved construction the knife is provided with a circular or arcuate cutting edge and the protecting device is in the form of a rotatable toothed disk with its periphery substantially following the cutting edge of the knife. The knife is held against rotation in respect to the handle, but the protecting device is so mounted that it may rotate and the teeth or points thereof move along the cutting edge of the knife. Thus in operating the tool the protecting device may roll along without offering objectionable resistance while the knife is drawn or pushed along to do the cutting.

Other objects and important features of my invention will be pointed out hereinafter, or will be apparent from a consideration of the specific form hereinafter described and illustrated in the accompanying drawings.

In these drawings:

Fig. 1 is a side view of a tool embodying my invention, and

Fig. 2 is a central longitudinal section.

The apparatus in the form shown has a circular disk knife 1 which is detachably mounted on a support 2 carried by the handle 3. The support 2 is flat on the side toward the knife, but is slightly convex upon its opposite side. It is preferably of circular form, and of slightly less diameter than the knife, and has a comparatively thin edge adjacent to but spaced from the knife edge. The support 2 carries a stud bolt 4 which may pass through a central aperture in the knife. In order to prevent the rotation of the knife on the stud bolt, various means might be employed, but as shown, the knife blade has three holes 5 arranged at equal distances from each other around the central aperture, and adapted to receive studs or bosses 6 on the support 2.

The stud 4 serves to support a rotatable disk 7 having teeth or prongs 8 along its periphery. The curved edge portions between adjacent teeth is sharpened. The ends of the teeth protrude beyond the cutting edge of the knife 1, but most of the knife edge is exposed for operation between adjacent teeth. The disk with its hub 9 is rotatably mounted in a nut 10 which is threaded on the stud bolt. The disk is slightly concave so that it clears the studs 6 on the support 2 and has its edge in engagement with the edge of the knife. By tightening the nut 10 the disk is pressed firmly against the knife and the latter is held on its stud 6 and against rotation while the disk 7 may turn easily.

The operation of the tool is as follows: With one hand the worker holds the tool by the handle, while with the other he pulls the loose skin away from the carcass, at the same time making cutting movements by pressing the tool into the connective tissue between the skin and carcass. The protecting disk is thus given a rolling movement in the connective tissue while the protected edge of the knife has a sliding movement which is required for efficient cutting. The rolling movement of the disk causes the teeth to press into the connective tissue without cutting and without piercing the skin. The skin of course is very much firmer and offers greater resistance than does the connective tissue. While this tissue can be punctured by the teeth, there is little or no liability of any puncturing of the skin. The entry of the teeth into the connective tissue thus serves as an exact lead for the knife into the part to be cut, while protecting the skin from any cutting by the knife. Furthermore the rolling movement of the disk is not one favorable to any cutting action. As the knife becomes dulled along the portion of its periphery which is in use, it will be apparent that the nut 10 may be removed at any time and the knife rotated through 120° to bring a new section of its periphery into cutting position. Thus it is not necessary to sharpen the knife as frequently as is required with most tools. The knife can be easily interchanged at any time by removing the nut and this nut is preferably ribbed or roughened to facilitate its tightening or removal without the use of tools. The shape of the handle is not essential and may be varied within wide limits. Preferably it has oppositely disposed thumb rests 11 so that the tool may be used equally well with either edge of the knife uppermost. The knife instead of being a full circular disk, may form only a segment of a circle, as only a segment is in use at any one time. Furthermore a second toothed disk might be employed on the opposite side of the cutting blade if desired.

Having thus described my invention, what I claim as new and desire to secure by Letters Patent is:—

1. A skinning tool including a support, a circular knife non-rotatably secured to said support, and a rotatable protecting member coaxial with said knife.

2. A skinning tool including a handle having a knife support presenting a curved edge a disk shaped knife detachably secured on said support, means for preventing rotation of said knife and a circular protecting member rotatably mounted on said support and with portions of its edge projecting beyond the cutting edge of the knife.

3. A skinning tool including a handle having a knife support presenting a curved edge, a disk shaped knife detachably and non-rotatably secured on said support, and a circular protecting member rotatably mounted on said support, said protecting member having an annular row of teeth at its periphery and projecting beyond the cutting edge of the knife whereby the protecting member is caused to rotate by engagement with the parts being cut as the knife is drawn along said parts.

4. A skinning tool including a handle having a knife support, a circular knife, means for securing said knife on said support in rotatably adjusted position and holding the same against rotation whereby the desired part of the edge may be held in operative position, and a circular projecting plate coaxial with said knife and rotatable in respect thereto.

5. A skinning tool including a handle having a blade support, a circular blade, means for securing said blade on said support in rotatably adjusted position and holding the same against rotation, and a circular protecting plate coaxial with said blade and rotatable in respect thereto, said plate having edge portions spaced inward radially from the edge of the blade and projections extending outwardly beyond the edge of the blade.

6. A skinning tool including a handle provided with a blade support having a circular edge, a disk shaped blade detachably secured to said support with its cutting edge projecting beyond the circular edge of the support and coaxial therewith, a circular projecting plate mounted for free rotation on said support and in engagement with the outer surface of said blade, said plate having teeth projecting beyond the cutting edge of said blade, said support being provided with an eccentric projection, and said blade being provided with a plurality of apertures adapted to receive said projection and hold the knife against rotation in any one of a plurality of rotatably adjusted positions.

7. A skinning tool including a blade support, a stud bolt carried thereby, a circular blade encircling said bolt, means for holding said blade against rotation and a protecting plate encircling said bolt and rotatable in respect thereto.

8. A device as defined in claim 7, in which the protecting device is provided with an annular row of radially extending teeth projecting beyond the cutting edge of the blade.

9. A skinning tool including a handle having a circular blade support provided with a centrally disposed stud bolt and an eccentrically disposed projection, a circular blade having a central hole to receive said stud bolt, and a plurality of apertures any one of which may receive said projection, a circular slightly concave blade protector rotatably mounted on said stud bolt with radially projecting teeth extending beyond the edge of the blade, and a nut on said stud bolt for pressing the peripheral portion of said protector against said blade.

Signed at Zurich, Switzerland this 23rd day of March A. D. 1925.

HUBERT JEZLER.